(12) United States Patent
Qian et al.

(10) Patent No.: US 11,192,974 B2
(45) Date of Patent: Dec. 7, 2021

(54) CONTROLLABLE-CURE URETHANE ACRYLATE RESIN COMPOSITIONS AND METHODS OF MAKING SAME

(71) Applicant: DOW GLOBAL TECHNOLOGIES LLC, Midland, MI (US)

(72) Inventors: Huifeng Qian, Pearland, TX (US); Luigi Pellacani, Carpi (IT); Muhammad A. Shafi, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 16 days.

(21) Appl. No.: 16/957,495

(22) PCT Filed: Nov. 13, 2018

(86) PCT No.: PCT/US2018/060639
§ 371 (c)(1),
(2) Date: Jun. 24, 2020

(87) PCT Pub. No.: WO2019/133119
PCT Pub. Date: Jul. 4, 2019

(65) Prior Publication Data
US 2021/0070922 A1    Mar. 11, 2021

(30) Foreign Application Priority Data

Dec. 27, 2017  (IT) .................. 102017000149916

(51) Int. Cl.
*C08G 18/76*    (2006.01)
*C08G 18/10*    (2006.01)
(Continued)

(52) U.S. Cl.
CPC ......... *C08G 18/7664* (2013.01); *C08G 18/10* (2013.01); *C08G 18/3206* (2013.01); *C08G 18/4841* (2013.01); *C08G 18/7621* (2013.01)

(58) Field of Classification Search
CPC ............................ C08G 18/672; C08G 18/10
See application file for complete search history.

(56) References Cited

U.S. PATENT DOCUMENTS 4,128,600 A   12/1978  Skinner et al.
4,902,440 A   2/1990   Takeyama et al.
(Continued)

*Primary Examiner* — Michael M Dollinger

(57) ABSTRACT

Controllable-cure urethane acrylate resin compositions are disclosed, comprising (A) a urethane acrylate having free hydroxyalkyl (meth) acrylate prepared from a polyurethane prepolymer having a free terminal isocyanate group and a hydroxyalkyl (meth)acrylate, the urethane acrylate having free hydroxyalkyl (meth) acrylate being the reaction product of capping the polyurethane prepolymer in the presence excess of the hydroxyalkyl (meth)acrylate, (B) a polyisocyanate-based thickening agent, and optionally an additional hydroxyalkyl (meth)acrylate, wherein the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.2 to 10.0. Methods for making controllable-cure urethane acrylate resin compositions are disclosed.

10 Claims, 1 Drawing Sheet

(51) Int. Cl.
 *C08G 18/32* (2006.01)
 *C08G 18/48* (2006.01)

(56) References Cited

U.S. PATENT DOCUMENTS

| | | |
|---|---|---|
| 5,153,246 A | 10/1992 | Michaels et al. |
| 7,829,637 B2 | 11/2010 | Guha et al. |
| 2005/0239955 A1 | 10/2005 | Kielbasa et al. |
| 2006/0051593 A1 | 3/2006 | Peeler et al. |
| 2006/0079624 A1* | 4/2006 | Nava .................. C08L 25/08 524/492 |
| 2012/0214894 A1* | 8/2012 | Schwalm ............ C08G 18/672 522/78 |
| 2017/0130019 A1 | 5/2017 | Sun et al. |

\* cited by examiner

CONTROLLABLE-CURE URETHANE ACRYLATE RESIN COMPOSITIONS AND METHODS OF MAKING SAME

REFERENCE TO RELATED APPLICATIONS

The present application claims the benefit of Italian Application No. 102017000149916, filed on Dec. 27, 2017.

FIELD OF THE DISCLOSURE

The present disclosure relates to controllable-cured urethane acrylate compositions and methods of making same. In particular, the disclosed controllable-cure urethane acrylate resin compositions comprise (A) a urethane acrylate having free hydroxyalkyl (meth) acrylate, (B) a polyisocyanate-based thickening agent, and, optionally, an additional hydroxyalkyl (meth)acrylate, wherein the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.2 to 10.0.

BACKGROUND AND SUMMARY OF THE DISCLOSURE

Thermosetting resins used in composite materials typically include unsaturated polyesters, vinyl esters, epoxies, phenolics and polyurethanes. Recently, urethane acrylates have been used in composite materials as well. Urethane acrylates are generally manufactured in a two-step process. The first step typically includes reacting a polyisocyanate with a polyol, often in the presence of a suitable solvent, to produce a polyurethane oligomer. The second step includes capping the polyurethane oligomer with a capping compound, such as a compound containing an isocyanate-active group and acrylic, methacrylic, vinyl or allyl groups. A diluent, e.g., reactive and/or non-reactive, may be added to reduce the viscosity of resin and facilitate the applications. Compared with unsaturated polyester, urethane acrylates render composite materials having better mechanical properties.

The polymerization or curing of urethane acrylates requires polymerization initiators, such as by thermally or light curing. As for thermal curing, the curing temperature is dependent on the particular catalyst used. Traditional thermal curing catalysts include organic peroxides (e.g., methyl ethyl ketone peroxide) and azo compounds (e.g., azobisisobutyronitrile). As for light curing, the light source is dependent on the particular photoinitiator catalyst used. Examples of suitable light sources have traditionally included visible light and UV light. The curing process typically proceeds in three stages: (1) A-Stage, in which the composition is primarily uncured monomers and oligomers; (2) B-Stage, in which the composition exhibits linear growth and branching to an increasingly more viscous, partially cured composition; and (3) C-Stage, in which the composition is fully cured.

However, it is difficult to achieve controllable-cure of B-stage of a urethane acrylate resin by simply using radical initiators (e.g., organic peroxide, azo compounds or photoinitiator). For many applications in composite fabrication processing, such as sheet moulding composite ("SMC") and pre-impregnated composite ("prepreg"), the thermosetting resin must be partially curable to achieve a relatively high viscosity, e.g., >10$^6$ mPa·s, in the intermediate step (i.e., B-Stage) and then fully curable in the final step (i.e., C-Stage). The ability to control the cure of such urethane acrylate compositions is, therefore, desirable. Methods of controllably curing such resins are also desirable.

In some embodiments, controllable-cure urethane acrylate resin compositions are disclosed. In some embodiments, the controllable-cure urethane acrylate resin compositions comprise (A) a urethane acrylate having free hydroxyalkyl (meth) acrylate prepared from a polyurethane prepolymer having a free terminal isocyanate group and a hydroxyalkyl (meth)acrylate, the urethane acrylate having free hydroxyalkyl (meth) acrylate being the reaction product of capping the polyurethane prepolymer in the presence excess of the hydroxyalkyl (meth)acrylate. In some embodiments, the controllable-cure urethane acrylate resin compositions further comprise (B) a polyisocyanate-based thickening agent. In some embodiments, the controllable-cure urethane acrylate resin compositions comprise an optional additional hydroxyalkyl (meth)acrylate. In some embodiments, the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.2 to 10.0.

In some embodiments, the controllable-cure urethane acrylate resin compositions further comprise (C) a reactive diluent (other than a hydroxyalkyl (meth)acrylate), (D) a free-radical catalyst, and/or (E) an additive.

In some embodiments, methods for making controllable-cure urethane acrylate resin compositions comprise (1) reacting a polyisocyanate and a polyol to form a isocyanate-terminated polyurethane prepolymer, (2) capping the polyurethane prepolymer with excess a hydroxyalkyl (meth) acrylate to form a urethane acrylate having free hydroxyalkyl (meth)acrylate, and (3) blending the urethane acrylate having free hydroxyalkyl (meth)acrylate (A) with (B) an polyisocyanate-based thickening agent at a NCO/OH molar ratio of from 0.2 to 10.0 to form the controllable-cure urethane acrylate resin composition.

In some embodiments, the methods for making a controllable-cure urethane acrylate resin compositions further comprise adding a reactive diluent to the controllable-cure urethane acrylate resin compositions. In some embodiments, the methods for making a controllable-cure urethane acrylate resin compositions further comprise adding a free radical-generating catalyst to the controllable-cure urethane acrylate resin composition. In some embodiments, the methods for making a controllable-cure urethane acrylate resin compositions further comprise adding an additive to the controllable-cure urethane acrylate resin composition.

BRIEF DESCRIPTION OF THE DRAWINGS

Reference is made herein to the following Figures, of which.

DETAILED DESCRIPTION OF THE DISCLOSURE

Figure 1:
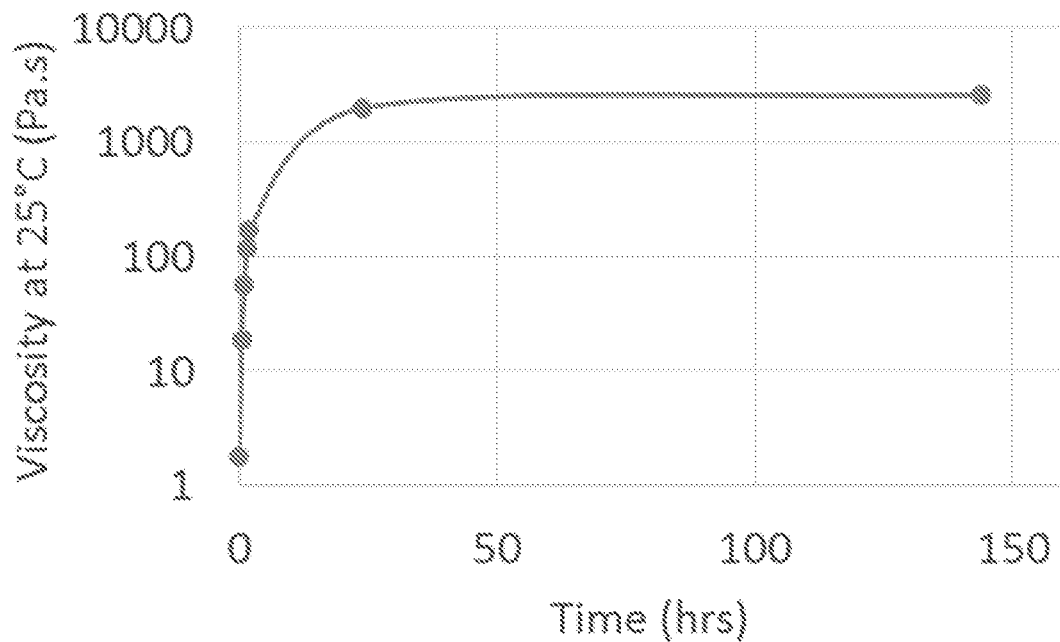
FIG. 1 shows a graph of the viscosity evolution of Illustrative Example 2 from A-stage to B-stage.

In some embodiments, controllable-cure urethane acrylate resin compositions are disclosed. In some embodiments, the controllable-cure urethane acrylate resin compositions comprise (A) a urethane acrylate having free hydroxyalkyl (meth) acrylate prepared from an isocyanate-terminated polyurethane prepolymer and a hydroxyalkyl (meth)acrylate. In some embodiments, the controllable-cure urethane acrylate resin compositions further comprise (B) a polyisocyanate-based thickening agent. In some embodiments, the urethane acrylate (A) and the polyisocyanate-based thickening agent (B) are present at a NCO/OH molar ratio of from 0.2 to 10.0 (e.g., 0.5 to 8.0, 0.5 to 5.0, 0.5 to 3.0, 0.5 to 2.0, 0.5 to 1.5, 0.9 to 1.1, etc.).

(A) Urethane Acrylate Having Free Hydroxyalkyl (Meth) Acrylate

The urethane acrylate having free or excess hydroxyalkyl (meth)acrylate is prepared by reacting a polyisocyanate and a polyol to form an isocyanate-terminated polyurethane prepolymer, and then capping the polyurethane prepolymer with an excess amount of a hydroxyalkyl (meth)acrylate.

(A)(1) Isocyanate-Terminated Polyurethane Prepolymer

The isocyanate-terminated polyurethane prepolymer used to prepare the urethane acrylate composition is a polyurethane prepolymer having a free terminal isocyanate group. The isocyanate-terminated polyurethane prepolymer is prepared by reacting a polyisocyanate and a polyol. As used herein, a "polyisocyanate" is any compound that contains two or more isocyanate groups. In some embodiments, the polyisocyanate can be an isocyanate monomer. In some embodiments, the polyisocyanate can include dimers, trimers, etc.

In some embodiments, suitable polyisocyanates for producing the isocyanate-terminated polyurethane prepolymer can be selected from the group consisting of an aliphatic polyisocyanate, a cycloaliphatic polyisocyanate, an aromatic polyisocyanate, and combinations of two or more thereof. An "aromatic polyisocyanate" is a polyisocyanate that has an isocyanate radical bonded to an aromatic radical and contains one or more aromatic rings. An "aliphatic polyisocyanate" contains no isocyanate radical directly bonded to an aromatic ring or is better defined as an isocyanate which contains an isocyanate radical bonded to an aliphatic radical which can be bonded to other aliphatic groups, a cycloaliphatic radical or an aromatic ring (radical). A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof. Suitable aliphatic polyisocyanates have 3 to 16 carbon atoms, or 4 to 12 carbon atoms, in the linear or branched alkylene residue, such as hexamethylene diisocyanate ("HDI") and 1,4-diisocyanatobutane, and mixtures of the of two or more thereof.

Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("H$_{12}$MDI"), and mixtures of the of two or more thereof.

Suitable aliphatic and cycloaliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H$_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof. Additional polyisocyanates suitable for use according to this disclosure include, but are not limited to, 4-methyl-cyclohexane 1,3-diisocyanate, 2-butyl-2-ethylpentamethylene diisocyanate, 3 (4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane, and mixtures of the of two or more thereof.

In some embodiments, suitable polyols for producing the isocyanate-terminated polyurethane prepolymer can be polyether polyols and/or polyester polyols. In some embodiments, the polyol has a hydroxy functionality of two or more (e.g., di-functional, tri-functional, and so on). As used herein, the term "hydroxyl functionality" refers to the number of isocyanate-reactive sites on a molecule. For polyols, an average hydroxyl functionality is generally the total moles of OH divided by the total moles of polyol. Commercially available examples of suitable polyols for use according to this disclosure include, but are not limited to, VORANOL™ 8000LM, VORANOL™ 4000LM, polypropylene glycol P2000, VORANOL™ 1010L, polypropylene glycol P425, TPG, VORANOL™ 230-660, and combinations of two or more thereof.

The amounts of the polyisocyanate and the polyol can be adjusted in such a way that the NCO reactive group to NCO group ratio is in the range of from 0.25 to 0.90 (e.g., from 0.35 to 0.80, from 0.40 to 0.60, from 0.40 to 0.50). The ratio can be 0.4 in some embodiments, and 0.5 in various other embodiments.

The polyisocyanate/polyol reaction to produce the isocyanate-terminated polyurethane prepolymer can take place in a solvent-free environment or a solvent-containing environment.

In various embodiments, a catalyst can be used to accelerate the reaction. Any suitable catalyst that can catalyze a polyisocyanate/polyol reaction can be used. In general, such catalysts are based on tertiary amines or metal complexes. Tertiary amines used as catalysts include, but are not limited to, triethylenediamine ("TEDA"), 1,4-diazabicyclo[2.2.2]octane ("DABCO"), dimethylcyclohexylamine ("DMCHA"), and dimethylethanolamine ("DMEA"). Metallic compounds based on tin, bismuth, zinc can also be used as catalysts for this purpose.

(A)(2) Hydroxyalkyl (Meth)Acrylate Capping Agent

After forming the isocyanate-terminated polyurethane prepolymer, an excess of a capping compound is added to react with unreacted isocyanates present in the isocyanate-terminated polyurethane prepolymer. This is in excess in relation to the stoichiometric ratio of OH/NCO. The weight percentage of free capping agent in the total formulation is from about 5% to 50% (e.g., from 10% to 50%, from 20% to 50%, from 25% to 45%, from 30% to 40%). Optionally, the composition may include additionally added Hydroxyalkyl (meth)acrylate, e.g., to adjust the stoichiometric ratio of OH/NCO in the composition.

In some embodiments, the capping compound contains a nucleophile with active hydrogen which reacts with the isocyanate groups, thus capping the urethane with ethylenically unsaturated functional groups, and ethylenically unsaturated functionalities derived from (meth)acrylate or vinyl/allyl groups. Examples of suitable capping agent compounds that can be used include, but are not limited to, hydroxyalkyl (meth)acrylates such as hydroxyethyl acrylate, hydroxypropyl acrylate, hydroxyethyl methacrylate, hydroxyethyl acrylamide, hydroxypropyl acrylamide, and combinations of two or more thereof.

An inhibitor can optionally be included in the reaction mixture to avoid free radical polymerization of the (meth) acrylate. Examples of suitable inhibitors include, but are not limited to, (2,2,6,6-Tetramethylpiperidin-1-yl)oxyl ("TEMPO"), mono methyl ether of hydroquinone ("MEHQ"), dihydroxybenzenes, benzoquinones, hindered phenols, and hindered phenols based on triazine derivatives. If included, the inhibitor is present in the reaction mixture at a total weight in the range of from 50 to 1,000 ppm.

In some embodiments, the free % NCO in the urethane acrylate is from 0 to 0.1 percent by weight, or from 0 to 0.001 percent by weight.

(B) Polyisocyanate-Based Thickening Agent

The urethane acrylate having free hydroxyalkyl (meth) acrylate and optionally additionally added hydroxyalkyl (meth) acrylate are mixed together with a polyisocyanate-based thickening agent to form the controllable-cure urethane acrylate resin composition. In some embodiments, the urethane acrylate having free hydroxyalkyl (meth) acrylate, optionally additionally added hydroxyalkyl (meth) acrylate, and the polyisocyanate-based thickening agent are mixed at NCO/OH molar ratio of from 0.2 to 10.0. In some embodiments, the urethane acrylate having free hydroxyalkyl (meth) acrylate and the polyisocyanate-based thickening agent are mixed at NCO/OH molar ratio of from 0.9 to 1.1.

In some embodiments, suitable polyisocyanates for use in the polyisocyanate-based thickening agent can be selected from the group consisting of an aliphatic polyisocyanate, a cycloaliphatic polyisocyanate, an aromatic polyisocyanate, and combinations of two or more thereof.

Suitable aromatic polyisocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof. Suitable aliphatic polyisocyanates have 3 to 16 carbon atoms, or 4 to 12 carbon atoms, in the linear or branched alkylene residue, such as hexamethylene diisocyanate ("HDI") and 1,4-diisocyanatobutane, and mixtures of the of two or more thereof.

Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("$H_{12}$MDI"), and mixtures of the of two or more thereof.

Suitable aliphatic and cycloaliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("$H_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof. Additional polyisocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane, and mixtures of the of two or more thereof. In some embodiments, the NCO content of the polyisocyanate, as measured according to ASTM D2572, can be more than 20% by weight, or more than 25% by weight, or more than 32% by weight.

(C) Optional Reactive Diluents

Optionally, a reactive diluent (other than the free hydroxyalkyl (meth)acrylate present in the urethane acrylate component (A)) can be added to the reaction mixture simultaneously with the capping agent, or after addition of the capping agent (e.g., hydroxyalkyl (meth)acrylate). In some embodiments, the reactive diluent is a liquid reaction medium containing at least one ethylenic double bond. In some embodiments, the reactive diluent is curable by polymerization in the existence of free radical catalyst. Examples of such reactive diluents include, but are not limited to, vinyl toluene, divinyl benzene and (meth)acrylates such as methyl methacrylate, tert-butyl methacrylate, iso-butyl methacrylate, hydroxyethyl acrylate, hydroxypropyl acrylate, hydroxyethyl methacrylate, hydroxyethyl acrylamide, hydroxypropyl acrylamide, and combinations of two or more thereof. Still more reactive diluents suitable for use include glycols and/or polyether polyols with terminal acrylate or methacrylate groups, thus carrying two or more ethylenic double bonds: preferred diluents include 1,4-butanediol diacrylate ("BDDA"), 1,6-hexanediol diacrylate ("HDDA"), diethylene glycol diacrylate, 1,3-butylene glycol diacrylate, neopentyl glycol diacrylate, cyclohexane dimethanol diacrylate, dipropylene glycol diacrylate, tripropylene glycol diacrylate, ethoxylated bisphenol A diacrylate, trimethylolpropane triacrylate, pentaerythritol triacrylate, pentaerythritol tetraacrylate, their corresponding methacrylate analogues, and all other related derivatives. Combinations of two or more of any of the reactive diluents described above can also be used.

(D) Optional Free-Radical Catalyst

Optionally, a free radical-generating catalyst can be added to the reaction mixture along with the reactive diluent (C). Suitable free-radical-generating catalysts include, but are not limited to, peroxide or azo type compounds. Peroxide compounds include, but are not limited to, organo peroxides and hydroperoxides such as tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Azo compounds include, but are not limited to azobisisobutyronitrile, 2-tbutylazo-2-cyano-4-methylpentane, and 4-t-butylazo-4-cyano-valeric acid. The free-radical catalyst is optionally added to cure resin from B-stage to C-stage.

It should be noted that the free radical catalyst system, namely the peroxides or azo compounds, plus the other ingredients directly associated with the speed of radical polymerization (activators, accelerators, retarders—each discussed below) are preferably added to the rest of the controllable-cure urethane acrylate resin composition before the resin undergoes polymerization.

(E) Optional Additives

Other ingredients, or additives, may also be added to the controllable-cure urethane acrylate resin composition, such as activators: these are metal carboxylates capable of increasing the effectiveness of the free radical-generating catalyst, consequently improving the degree of polymerization of the curable resin. Examples of activators include metal carboxylates, and cobalt salts such as cobalt naphtenate, and they may be used at a level of about 0.01 to 1% by weight of the curable resin composition. Accelerators represent another ingredient that can effectively increase the speed and completeness of the radical polymerization of the curable resin. The accelerator may be selected from the group of anilines, amines, amides, pyridines, and combinations of two or more thereof. In various embodiments, the accelerator, if included, includes a dimethyl toluidine or a dialkyl aniline. In various other embodiments, the accelerator, if included, includes N,N-dimethyl-p-toluidine, N,N-diethylaniline, N,N-dimethylaniline, and combinations of two or more thereof. If present, the accelerator is generally present in an amount of from 0.01 to 0.5 by weight of the curable resin composition. The curable resin composition prepared by the process of the present invention may also include a gel time retarder. Addition of a gel time retarder decreases the gel time of the curable resin composition. If included, the gel time retarder is generally selected from the group of diones, quinones, and phenolic derivatives, and combinations of two or more thereof. In various embodiments, if included, the gel time retarder includes 2,4-pentanedione. In various other embodiments, if included, the gel time retarder is included in an amount of from 0.01 to 0.3 by weight of the resin system.

Other ingredients may be also included in the curable resin composition prepared by the process of the present invention, some of these preferably shortly before the curable resin undergoes polymerization, to avoid possible negative impact on the storage stability of the curable resin. Thus, internal mold release agents may be included to facilitate the release of the polymerized composite article from the mold in which it has been prepared: the amount may range from about 0.1% to about 5% by weight of the curable resin composition, and examples of suitable products are the internal mold release agents for composite applications available from Axel or from Wurtz.

Other types of ingredients that may be included in the curable resin are fillers, which may be used for a number of different reasons, such as to provide pigmentation, flame retardance, insulation, thixotropicity, aid with dimensional stability and physical properties, and reduced cost of the composite structure. Suitable fillers for the urethane acrylate layer include reactive and non-reactive conventional organic and inorganic fillers. Examples include, but are not limited to, inorganic fillers, such as calcium carbonate, silicate minerals, for example, both hollow and solid glass beads, phyllosilicates such as antigorite, serpentine, hornblends, amphiboles, chrysotile, and talc; metal oxides and hydroxides, such as aluminum oxides, aluminium hydroxide, titanium oxides and iron oxides; metal salts, such as chalk, barite and inorganic pigments, such as cadmium sulfide, zinc sulfide and glass, inter alia; kaolin (china clay), and aluminum silicate and co-precipitates of barium sulfate and aluminum silicate. Examples of suitable organic fillers include, but are not limited to, carbon black and melamine Thixotropic agents that are useful in this invention include fumed silica, organoclays, inorganic clays and precipitated silica. The amount of filler used for the purposes of this invention, will depend of the type of filler and reason for its presence in the system: thus, the thixotropic agents are often used at levels of up to about 2 percent by weight, while fillers that have a flame retardant action such as aluminium hydroxide, may be used in much larger amounts, in an amount that is in fact comparable or even larger than the amount of curable resin, comprising the urethane acrylate plus the reactive diluent.

Other additives having specific functions, as known in the industry, may also be included in the curable resin composition: examples include but are not limited to, air release agents, adhesion promoters, leveling agents, wetting agents, UV absorbers and light stabilizers.

In some embodiments, methods for making a controllable-cure urethane acrylate resin compositions comprise (1) reacting a polyisocyanate and a polyol to form an isocyanate-terminated polyurethane prepolymer, (2) capping the polyurethane prepolymer with excess a hydroxyalkyl (meth) acrylate to form a urethane acrylate having free hydroxyalkyl (meth)acrylate, and (3) blending the urethane acrylate having free hydroxyalkyl (meth)acrylate (A) with (B) an polyisocyanate-based thickening agent at a NCO/OH molar ratio of from 0.2 to 10.0 to form the controllable-cure urethane acrylate resin composition.

The initial viscosity of the controllable-cure urethane acrylate resin composition is below 20 Pa-s at room temperature, which allows the resin to impregnate glass/carbon fibers. This is the A-stage of the curing process. After a period of time (e.g., 0.5 hrs to several days), the controllable-cure urethane acrylate resin composition solidifies to B-stage, having a viscosity above 1,000 Pa-s. The maturation time can be adjusted from 0.5 hrs to one week by adding catalysts (e.g., DABCO T-12) or retardants (benzoyl chloride). In some embodiments, the disclosed controllable-cure urethane acrylate resins are B-stage resins having a viscosity not less than 1,000 Pa-s at 25° C.

A fully-cured article prepared from the disclosed resin compositions can be used to produce composites, including sheet moulding composites and pre-impregnated composites, coatings, adhesives, inks, encapsulations, or castings.

EXAMPLES OF THE DISCLOSURE

The present disclosure will now be explained in further detail by describing examples illustrating the disclosed adhesive compositions and existing adhesive compositions (collectively, "the Examples"). However, the scope of the present disclosure is not, of course, limited to the Examples.

The Examples are tested according to the following methods:

Viscosity measurements are performed on a TA Instruments AR 2000™ rheometer with 45 mm cone-plate geometry. Data is collected at a constant shear rate of 10 $sec^{-1}$ and at constant temperature.

The FTIR spectrum is collected using a Nicolet Nexus670™ infrared spectrometer equipped with a DuraScope™ single bounce diamond attenuated total reflectance ("ATR") accessory. Approximately 15 mg of sample is transferred to the ATR and the infrared spectrum from 4,000 to 650 $cm^{-1}$ is collected using a resolution of 4 $cm^{-1}$ and 16 scans.

The isocyanate content determination (% NCO) is performed according to ASTM D5155 (standard test method for polyurethane raw materials: determination of the isocyanate content of aromatic isocyanates—method C) using a Mettler DL55™ autotitrator equipped with two titration stands, two solvent pumps and an autosampler carousel. The sample is dissolved in trichlorobenzene and mixed with a known excess of dibutylamine in toluene. The resulting solution is stirred for 20 minutes and then diluted with methanol. The solution is titrated potentiometrically with standardized 1.0 N hydrochloric acid (aqueous) using a 20 mL burette. A blank analysis is performed, in duplicate, using the method described above but without adding the sample. The average of the blank analysis is used to calculate the % NCO using the following formula:

$$\% \, NCO = \frac{(B-S)N \times 4.202}{W}$$

where B is volume in mL of acid consumed by blank (duplicate average), S is the volume in mL of acid consumed by sample, N is the normality of acid, 4.202 is the equivalent weight of the isocyanate (NCO) moiety adjusted for conversion to percent, and W is the weight in g of the sample.

The raw materials used in the Examples are detailed in Table 1.

TABLE 1

| Raw Materials | |
|---|---|
| Trade/Chemical Name | General description |
| VORANATE ™ T-80 | An 80/20 blend of the 2,4 and 2,6 toluene diisocyanate ("TDI") isomers, available from The Dow Chemical Company (Midland, MI) |
| PAPI ™ 94 | A polymeric methylene diphenyl diisocyanate ("MDI") having an average molecular weight 325 and an average isocyanate functionality 2.5, available from The Dow Chemical Company (Midland, MI) |
| PAPI ™ 27 | A polymeric methylene diphenyl diisocyanate ("MDI") having an average molecular weight 340 and an average isocyanate functionality 2.7 |
| PAPI ™ 580N | A polymeric methylene diphenyl diisocyanate ("MDI") having an average molecular weight 375 and an average isocyanate functionality 3.0 |
| VORANOL ™ 220-110 | A propylene glycol-initiated polyether polyol, having a nominal hydroxyl functionality of 2, a hydroxyl number of 110 mg KOH/g, a number average molecular weight of 1,000 g/mol, and a viscosity at 25° C. of 160 cP available from The Dow Chemical Company (Midland, MI) |
| VORALUX ™ HF505 | A sorbitol initiated polyoxypropylene polyol capped with about 16 wt % ethylene oxide having a hydroxyl equivalent weight of about 1902, and is available from The Dow Chemical Company (Midland, MI) |
| VORANOL ™ 230-660 | A 250 molecular weight polyether triol available from The Dow Chemical Company (Midland, MI) |
| VORANOL ™ 8000LM | A propylene glycol-initiated polyether polyol, having a nominal hydroxyl functionality of 2 and a number average molecular weight of 8,000 g/mol, available from The Dow Chemical Company (Midland, MI) |
| POLYGLYCOL ™ P-425 | A polypropylene glycol having a number average molecular weight of 425, available from The Dow Chemical Company (Midland, MI) |
| DABCO ™ T-12 | Dibutyltin dilaurate ("DBTDL"), a urethane catalyst available from Air Products |
| ROCRYL ™ 400 | 2-hydroxyethyl methacrylate ("HEMA") available from The Dow Chemical Company (Midland, MI) |
| ROCRYL ™ 410 | Hydroxypropyl methacrylate ("HPMA") available from The Dow Chemical Company (Midland, MI) |
| Tripropylene Glycol (TPG) | Available from The Dow Chemical Company (Midland, MI) |
| VT | Vinyl toluene, a reactive diluent available from Deltech Corporation |
| Benzoyl chloride | Available from Sigma-Aldrich |
| BYK7410 ™ | A solution of a modified urea. This additive creates highly thixotropic flow behavior and consequently improves the anti-sagging and anti-settling properties. It is available from BYK USA Inc. |
| BYK606 ™ | A polyhydroxy carboxylic acid ester. It is a liquid rheology additive for solvent-borne and solvent-free adhesives and sealants based on polyurethane, epoxy, and acrylate resins that contain pyrogenic silica or organophilic phyllosilicates. It is available from BYK USA Inc. |
| AM 9033 ™ | Magnesium oxide dispersion (40% MgO) from Chromaflo Technologies |
| PGL 90832 ™ | Magnesium oxide and zinc stearate dispersion from Chromaflo Technologies |

Illustrative Example 1

The urethane acrylate having free hydroxyalkyl (meth) acrylate used in the Illustrative Example 1 is prepared in two steps according to the following preparation technique. The first step involves preparing the isocyanate-terminated polyurethane prepolymer. Typically, in the first step, 185.0 grams of VORANATE™ T80, 85.0 grams of VORALUX™ HF505, 44.85 grams of low MW polyol blend (TPG, P425, and VORANOL™ 230-660 in weight ratio of 1:1:1) are added to a flask and temperature of reaction is initially set at 45° C. After about 30 minutes, another 44.85 grams of low MW polyol blend (TPG, P425, VORANOL™ 230-660 in weight ratio of 1:1:1) is added to the flask, then the reaction temperature is kept at 70 to 80° C. for about 2 hours. Reaction progress is monitored by measuring (titration) the wt % NCO. The prepolymer synthesis is complete when the wt % NCO is within ±0.2% of the target wt % NCO.

The second step is capping the isocyanate-terminated polyurethane prepolymer with HPMA. In the second step, 432.7 grams of HPMA is premixed with 0.6 grams of TEMPO and added to the flask simultaneously. The reaction temperature is kept at 60 to 70° C. for about 2 hours. Then, 0.1 gram of DABCO™ T-12 catalyst is added to the flask and the reaction temperature is kept at 60 to 70° C. for another 30 minutes. Reaction progress is monitored by the disappearance of the NCO signal (2271 cm$^{-1}$) by FTIR. Once the signal is no longer detectable, the capping step is complete. HPMA is present in excess (i.e., more than minimally required) for capping of the prepolymer, which will also serve as reactive diluents in the resin formulation.

Illustrative Example 2

TABLE 2

Formulation of Illustrative Example 2 and Viscosity Evolution from A-stage to B-stage

| Components | Sample No./ Amount (wt %) |
|---|---|
| Illustrative Example 1 | 71.33 |
| PAPI™ 94 | 20.76 |
| Vinyl toluene | 7.92 |
| TRIGONOX™ C | 1.5 |
| Sum of resin | 100 |
| NCO/OH | 1 |
| t = 25° C. | |
| Viscosity (Pa-s), t = 0 min | 1.8 Pa-s |
| Viscosity (Pa-s), t = 30 min | 18.8 Pa-s |
| Viscosity (Pa-s), t = 24 hrs | 2,000 Pa-s |
| Viscosity (Pa-s), t = 144 hrs | 2,600 Pa-s |

Illustrative Example 2 includes Illustrative Example 1, PAPI™ 94, vinyl toluene and TRIGONOX™ C in the amounts indicated in Table 2. As described above, Illustrative Example 1 is the urethane acrylate resin with HPMA as reactive diluents, which includes about 64.6% urethane acrylate prepolymer and 31.4% HPMA as reactive diluents. PAPI™ 94 is polymeric methylene diphenyl diisocyanate having an average molecular weight of 325 g/mol and an average isocyanate functionality of 2.5. Vinyl toluene is an additional reactive diluent to reduce the viscosity of A-stage resin. TRIGONOX™ C is a free radical catalyst with onset temperature at about 120° C. TRIGONOX™ C is used to cure the resin from B-stage to C stage.

FIG. 1 shows the viscosity evolution of Illustrative Example 2 from A-stage to B-stage. Shortly after the resin composition is mixed, the initial viscosity is 1.8 Pa-s at 25° C. After 24 hours, the viscosity of resin composition increases to 2,000 Pa-s, which is semi-solid.

Figure 2:
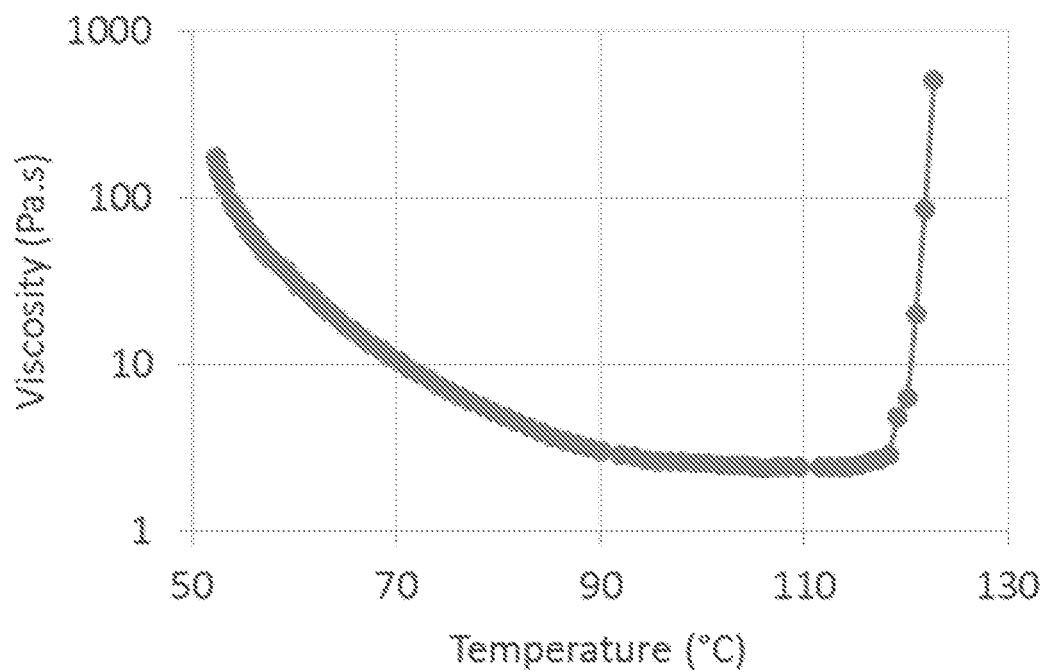
FIG. 2 shows a graph of the viscosity versus temperature profile of Illustrative Example 2 from B-stage to C-stage.

FIG. 2 shows the viscosity versus temperature profile of the resin formulation of Illustrative Example 2 from B-stage to C-stage. The viscosity of resin is measured with ARES with steady shear flow 10 S$^{-1}$ and temperature increase with 20° C./min from 60° C. to 150° C. Since B-stage resin is partially cured and does not form a complete crosslinked network, the viscosity of the resin decreases with the increase of temperature. After reaching the onset temperature of the free-radical catalyst (i.e., TRIGONOX™ C) at about 120° C., radical polymerization is kicked off and B-stage resin is fully cured.

Illustrative Examples 3 Through 5

TABLE 3

Formulations of Illustrative Examples 3 through 5 and Viscosity Evolutions from A-stage to B-stage

| Components | Sample No./Amount (wt %) | | |
|---|---|---|---|
| | Illustrative Example 3 | Illustrative Example 4 | Illustrative Example 5 |
| Illustrative Example 1 | 68.38 | 68.38 | 68.38 |
| HPMA | 6.5 | 6.5 | 6.5 |
| PAPI™ 94 | 25.13 | 25.13 | 25.13 |
| Benzoyl chloride | 0 | 0.1 | 0.6 |
| Sum of resin | 100 | 100.11 | 100.61 |
| NCO/OH | 0.97 | 0.97 | 0.97 |
| T = 30° C. | | | |
| Viscosity (Pa-s), t = 0 min | 4.27 | 1.05 | 1 |
| Viscosity (Pa-s), t = 30 min | 154.2 | 1.77 | 1.54 |
| Viscosity (Pa-s), t = 60 min | 726.5 | 3 | 2.6 |
| Viscosity (Pa-s), t = 24 hrs | 5,900 | 210 | 225 |
| Viscosity (Pa-s), t = 72 hrs | — | 3,170 | 3,560 |

Table 3 details the resin formulations of Illustrative Examples 3 through 5 and the viscosity evolutions from A-stage to B-stage. In Illustrative Examples 3 through 5, 0-0.6% benzoyl chloride is added to adjust the speed of viscosity increase from A-stage to B-stage. Benzoyl chloride reduces the reactivity between HPMA and isocyanate and slows down the speed of viscosity increase

Comparative Examples A Through C

TABLE 4

Resin Formulations for Comparative Examples A through C

| Components | Comparative Example A | Comparative Example B | Comparative Example C |
|---|---|---|---|
| Illustrative Example 1 | 68.38 | 68.38 | 13.2 |
| HPMA | 6.5 | 6.5 | 1.33 |
| PAPI™ 94 | 2.5 | 5 | 50 |
| Sum of resin | 77.38 | 79.88 | 64.53 |
| NCO/OH | 0.10 | 0.20 | 10.00 |
| T = 30° C. | | | |
| Viscosity (Pa-s), t = 0 min | 6.3 | 6.1 | 0.16 |
| Viscosity (Pa-s), t = 30 min | 7.3 | 10.6 | 0.27 |
| Viscosity (Pa-s), t = 60 min | | 13.6 | 0.46 |
| Viscosity (Pa-s), t = 24 hrs | 8 | 14.2 | 1.45 (72 hrs) |

Table 4 details the resin formulations and viscosity evolutions for Comparative Examples A through C. When the ratio of NCO/OH is less than 0.2 or higher than 10, the viscosity of the resin after 24 hours is only about 1 to 15 Pa-s at 25° C. Therefore, the ratio of NCO/OH should be between 0.2 and 10 to achieve the desired B-stage composition (i.e., viscosity in excess of ~1,000 Pa-s).

Comparative Examples D-H

TABLE 5

Resin Formulations for Comparative Examples D through H

| Components | Comparative Example D | Comparative Example E | Comparative Example F | Comparative Example G | Comparative Example H |
|---|---|---|---|---|---|
| Illustrative Example 1 | 81.5 | 81.5 | 81.5 | 81.5 | 81.5 |
| VT | 18.5 | 18.5 | 18.5 | 18.5 | 18.5 |
| Fume silica | | | 5 | 3 | 3 |
| BYK 7410 | | | | 1.5 | |
| BYK 606 | | | 1.5 | 1.5 | 1.5 |
| AM 9033 (MgO) | 3 | | | | |
| PGL 90832 (MgO & Zinc stearate) | | 3 | | | 3 |
| Benzoyl chloride | 0.5 | 0.5 | | | 0.5 |
| Observation | liquid | liquid | soft gel | soft gel | soft gel |
| Viscosity (Pa-s) at 25° C. after 48 hrs | | | 34 | 21 | 11 |

Table 5 details the resin formulations and viscosities for Comparative Examples D through H. Fume silica, BYK7410, BYK 606, AM9033 (MgO) and PGL 90832 (MgO & Zinc stearate) are typically thickening agent for thermosetting resin. These thickening agents are mixed with urethane acrylate to, inter alia, evaluate whether the urethane acrylate can achieve B-stage (viscosity at room temperature >1,000 Pa-s). In Comparative Examples D and E, the resins with AM9033 and PGL90832 as thickening agent are still liquid after 48 hours. In Comparative Examples F through H, the resins with fume silica, BYK 7410 or BYK 606 as thickening agent are gelled after 48 hours. However, the gelled resins return to liquid after shaking by hand. The viscosity of Comparative Examples F through H is only about 10 to 34 Pa-s at 25° C.

In summary, the B-stage urethane acrylate composition, including a) urethane acrylate with free hydroxyalkyl (meth) acrylate as reactive diluents, b) polyisocyanates as thickening agent is advantageous. The initial viscosity of this resin composition is below 20 Pa-s, which allows the resin to impregnate glass and/or carbon fibers. After a period of time (0.5 hours to several days), the resin composition solidifies to B-stage (viscosity above 1000 Pa-s). The maturation time can be adjusted from 0.5 hours to one week by adding catalysts (e.g., DABCO T-12) or retardants (benzoyl chloride).

In addition to the embodiments described above, many embodiments of specific combinations are within the scope of the disclosure, some of which are described below:

Embodiment 1. A controllable-cure urethane acrylate resin composition, comprising:
(A) a urethane acrylate having free hydroxyalkyl (meth) acrylate prepared from a polyurethane prepolymer having a free terminal isocyanate group and a hydroxyalkyl (meth)acrylate, the urethane acrylate having free hydroxyalkyl (meth) acrylate being the reaction product of capping the polyurethane prepolymer in the presence excess of the hydroxyalkyl (meth)acrylate;
(B) a polyisocyanate-based thickening agent; and optionally an additional hydroxyalkyl (meth)acrylate,
wherein the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.2 to 10.0.

Embodiment 2. The controllable-cure urethane acrylate resin composition of any preceding or succeeding Embodiment, wherein the polyurethane prepolymer is the reaction product of an isocyanate and a polyol.

Embodiment 3. The controllable-cure urethane acrylate resin composition of any preceding or succeeding Embodiment, wherein the polyisocyanate is selected from the group consisting of an aliphatic polyisocyanate, a cycloaliphatic polyisocyanate, an aromatic polyisocyanate, and combinations of two or more thereof.

Embodiment 4. The controllable-cure urethane acrylate resin composition of any preceding or succeeding Embodiment, wherein the polyol is selected from the group consisting of a polyester polyol, a polyether polyol, and combinations of two or more thereof.

Embodiment 5. The controllable-cure urethane acrylate resin composition of any preceding or succeeding Embodiment, wherein the polyisocyanate-based thickening agent comprises a polyisocyanate selected from the group consisting of an aliphatic polyisocyanate, a cycloaliphatic polyisocyanate, an aromatic polyisocyanate, and combinations of two or more thereof.

Embodiment 6. The controllable-cure urethane acrylate resin composition of any preceding or succeeding Embodiment, wherein the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.9 to 1.1.

Embodiment 7. The controllable-cure urethane acrylate resin composition of any preceding or succeeding Embodiment, further comprising (C) a reactive diluent.

Embodiment 8. The controllable-cure urethane acrylate resin composition of any preceding or succeeding Embodiment, further comprising (D) a free-radical catalyst.

Embodiment 9. The controllable-cure urethane acrylate resin composition of any preceding or succeeding Embodiment, further comprising (C) a reactive diluent and (D) a free-radical catalyst.

Embodiment 10. The controllable-cure urethane acrylate resin composition of any preceding or succeeding Embodiment, wherein the reactive diluent (C) does not include hydroxyalkyl (meth)acrylate.

Embodiment 11. The controllable-cure urethane acrylate resin composition of any preceding or succeeding Embodiment, wherein the reactive diluent (C) is a liquid reaction medium comprising at least one ethylenic double bond.

Embodiment 12. The controllable-cure urethane acrylate resin composition of any preceding or succeeding Embodiment, further comprising (E) an additive.

Embodiment 13. The controllable-cure urethane acrylate resin composition of any preceding or succeeding Embodiment, wherein the additive is selected from the group consisting of a pigment, a filler, a demolding agent, and combinations of two or more thereof.

Embodiment 14. A method for making a controllable-cure urethane acrylate resin composition, comprising:
  (1) reacting a polyisocyanate and a polyol to form a polyurethane prepolymer having a free terminal isocyanate group;
  (2) capping the polyurethane prepolymer with excess a hydroxyalkyl (meth)acrylate to form (A) a urethane acrylate having free hydroxyalkyl (meth)acrylate; and
  (3) blending the urethane acrylate having free hydroxyalkyl (meth)acrylate (A) with (B) an polyisocyanate-based thickening agent at NCO/OH molar ratio of from 0.2 to 10.0 to form the controllable-cure urethane acrylate resin composition.

Embodiment 15. The method of any preceding or succeeding Embodiment, further comprising adding a reactive diluent (C) to the controllable-cure urethane acrylate resin composition.

Embodiment 16. The method of any preceding or succeeding Embodiment, further comprising adding a free radical-generating catalyst (D) to the controllable-cure urethane acrylate resin composition.

Embodiment 17. The method of any preceding or succeeding Embodiment, wherein isocyanate-reactive functional groups and isocyanate functional groups are present in step (1) in a weight ratio in the range of from 0.25:1 to 0.9:1.

Embodiment 18. The method of any preceding or succeeding Embodiment, wherein the hydroxyalkyl (meth)acrylate is present in step (2) in an excess of at least 5% by weight.

Embodiment 19. The method of any preceding or succeeding Embodiment, wherein the hydroxyalkyl (meth)acrylate is selected from the group consisting of hydroxyethyl acrylate, hydroxypropyl acrylate, hydroxyethyl methacrylate, hydroxyethyl acrylamide, hydroxypropyl acrylamide, and combinations of two or more thereof.

Embodiment 20. The method of any preceding or succeeding Embodiment, wherein the reactive diluent (C) is selected from the group consisting of vinyl toluene, divinyl benzene, methyl methacrylate, tert-butyl methacrylate, iso-butyl methacrylate, hydroxyethyl acrylate, hydroxypropyl acrylate, hydroxyethyl methacrylate, hydroxyethyl acrylamide, hydroxypropyl acrylamide, 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, tripropylene glycol diacrylate, ethoxylated bisphenol A diacrylate, trimethylolpropane triacrylate, pentaerythritol triacrylate, pentaerythritol tetraacrylate, and combinations of two or more thereof.

Embodiment 21. The method of any preceding or succeeding Embodiment, wherein the free radical-generating catalyst (D) is selected from the group consisting of tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, azobis-isobutyronitrile, 2-tbutylazo-2-cyano-4-methylpentane, and 4-t-butylazo-4-cyano-valeric acid, and combinations of two or more thereof.

Embodiment 22. The method of any preceding or succeeding Embodiment, wherein an inhibitor selected from the group consisting of (2,2,6,6-Tetramethylpiperidin-1-yl)oxyl (TEMPO), Mono Methyl Ether of Hydroquinone (MEHQ), dihydroxybenzenes, the benzoquinones, hindered phenols, hindered phenols based on triazine derivatives, and combinations of two or more thereof is added concurrently with the hydroxyalkyl (meth)acrylate.

Embodiment 23. The curable resin composition prepared by the method of any preceding or succeeding Embodiment.

Embodiment 24. A B-stage urethane acrylate resin composition having a viscosity not less than 1,000 Pa·s at 25° C., comprising:
  (A) a urethane acrylate prepared from a polyurethane oligomer and a hydroxyalkyl (meth)acrylate;
  (B) an polyisocyanate-based thickening agent,
    wherein the urethane acrylate and polyisocyanate-based thickening agent are present at NCO/OH molar ratio of from 0.2 to 10.0.

Embodiment 25. The controllable-cure urethane acrylate resin composition of any preceding or succeeding Embodiment, wherein the resin is partially-cured such that it has a viscosity not less than 1,000 mPa-s at 25° C.

Embodiment 26. A sheet moulding composite material comprising the controllable-cure urethane acrylate resin composition according to any preceding or succeeding Embodiment.

Embodiment 27. A pre-impregnated composite material comprising the controllable-cure urethane acrylate resin composition according to any preceding or succeeding Embodiment.

Embodiment 28. A composite material comprising the controllable-cure urethane acrylate resin composition according to any preceding or succeeding Embodiment.

That which is claimed is:

1. A controllable-cure urethane acrylate resin composition, comprising:
  (A) a urethane acrylate having free hydroxyalkyl (meth) acrylate prepared from a polyurethane prepolymer having a free terminal isocyanate group and a hydroxyalkyl (meth)acrylate, the urethane acrylate having free hydroxyalkyl (meth) acrylate being the reaction product of capping the polyurethane prepolymer in the presence of an excess of the hydroxyalkyl (meth) acrylate;
  (B) a polyisocyanate-based thickening agent; and
  optionally an additional hydroxyalkyl (meth)acrylate,
  wherein the polyisocyanate-based thickening agent (B) and the urethane acrylate having free hydroxyalkyl (meth) acrylate (A), and optionally the additional hydroxyalkyl (meth)acrylate, are present at NCO/OH molar ratio of from 0.2 to 10.0.

2. The controllable-cure urethane acrylate resin composition of claim 1, wherein the polyisocyanate-based thickening agent comprises a polyisocyanate selected from the group consisting of an aliphatic polyisocyanate, a cycloaliphatic polyisocyanate, an aromatic polyisocyanate, and combinations of two or more thereof.

3. The controllable-cure urethane acrylate resin composition of claim 1, wherein the urethane acrylate having free hydroxyalkyl (meth) acrylate (A) and the polyisocyanate-based thickening agent (B) are present at NCO/OH molar ratio of from 0.9 to 1.1.

4. The controllable-cure urethane acrylate resin composition of claim 1, further comprising (C) a reactive diluent.

5. The controllable-cure urethane acrylate resin composition of claim 1, further comprising (D) a free-radical catalyst.

6. A method for making a controllable-cure urethane acrylate resin composition, comprising:

(1) reacting a polyisocyanate and a polyol to form a polyurethane prepolymer having a free terminal isocyanate group;

(2) capping the polyurethane prepolymer with an excess of a hydroxyalkyl (meth)acrylate to form (A) a urethane acrylate having free hydroxyalkyl (meth)acrylate; and (3) blending the urethane acrylate having free hydroxyalkyl (meth)acrylate (A) with (B) an polyisocyanate-based thickening agent at NCO/OH molar ratio of from 0.2 to 10.0 to form the controllable-cure urethane acrylate resin composition.

7. The method of claim 6, wherein the hydroxyalkyl (meth)acrylate is present in step (2) in an excess of at least 5% by weight.

8. The method of claim 6, wherein the hydroxyalkyl (meth)acrylate is selected from the group consisting of hydroxyethyl acrylate, hydroxypropyl acrylate, hydroxyethyl methacrylate, hydroxyethyl acrylamide, hydroxypropyl acrylamide, and combinations of two or more thereof.

9. The controllable-cure urethane acrylate resin composition of claim 1, wherein the resin is partially-cured such that it has a viscosity not less than 1,000 mPa·s at 25° C.

10. A composite material comprising the controllable-cure urethane acrylate resin composition according to claim 1.

* * * * *